Figure 1:
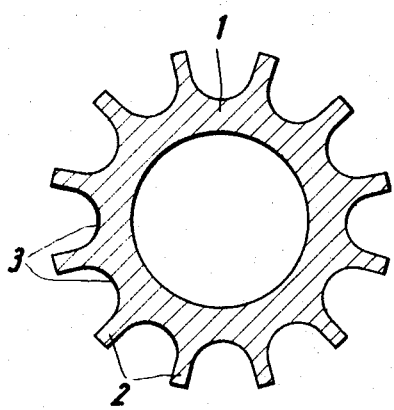

April 18, 1967   G. KRONE ET AL   3,314,449

PLASTIC TUBE

Filed Feb. 12, 1964   3 Sheets-Sheet 1

United States Patent Office 3,314,449
Patented Apr. 18, 1967

3,314,449
PLASTIC TUBE
Gustav Krone, Berlin-Dahlem, and Horst Forberg, Berlin-Zehlendorf, Germany, assignors, by mesne assignments, to Krone Kommanditgesellschaft, Berlin, Germany
Filed Feb. 12, 1964, Ser. No. 344,328
Claims priority, application Germany, Feb. 14, 1963, K 48,954; Mar. 22, 1963, K 49,276; Sept. 23, 1963, K 50,899, K 50,900
2 Claims. (Cl. 138—125)

The invention relates to a plastic tube, which is composed of a plurality of layers.

Plastic tubes are generally produced in homogeneous form, and the centrifugal casting method is preferred for tubes of larger diameter and production in extrusion presses for tubes of smaller diameter. The stiffness or flexibility of the tubes and also their strength have hitherto been the subject of attempts at control within certain limits by the addition of suitable additives.

Tubes are also known which have a core of thermoplastic material and an outer bandage of glass filament roving impregnated with polyester resin. Although such tubes have adequate strength in respect of bending stresses, they have only low loadability in the lengthwise direction. Moreover, for many purposes their resistance to heat is insufficient.

It is therefore the object of the invention to provide a laminated plastic tube which is above all distinguished by great strength.

According to the invention, this object is achieved by the following construction of the tube: a tubular plastic core, a number of glass filament rovings running in the lengthwise direction and applied to the outside of the core, and an outer bandage.

The laminated construction of the plastic tube according to the invention leads to extremely great strength despite the relatively low total weight and the low cost of production, and this strength far exceeds the corresponding values of comparable known plastic tubes. In particular, not only is great strength in respect of bending stresses obtained, but because of the use of the glass filament roving running in the lengthwise direction of the core, considerable loadability in the lengthwise direction of the tube is achieved.

The external bandage may for example be constituted by a tube of glass fibers impregnated with hardening synthetic-resin, or by a covering composed essentially of textile fibers.

A bandage composed of textile covering is extremely flexible and can effortlessly adapt itself to the bending of the plastic tube. A palstic tube of this type is also distinguished by particularly good "feel."

Another advantageous construction of the plastic tube according to the invention comprises forming the bandage of glass filament rovings impregnated with synthetic resin and preferably wound crosswise.

As compared with a plastic tube having a simple helical bandage, the construction with a crosswise wound bandage is distinguished by a particularly intimate bonding and extremely great strength of the outside layer.

Another possibility comprises utilizing glass fabrics or glass mats, impregnated with synthetic resin, as an outer bandage.

In one advantageous embodiment of the invention, the plastic core is provided on its outer side with ribs, while the glass filament roving runs in their lengthwise direction. These ribs increase the loadability of the plastic tube in the lengthwise direction, and at the same time during manufacture serve as a guide for the glass filament roving.

The ribs of the core and the glass filament roving applied to the outside of the core are advantageously so dimensioned that the outer bandage rests on the ribs.

In one preferred embodiment of the invention, the ribs provided on the outer side of the core run parallel to the axial direction of the tube, thus facilitating the formation of these ribs by the extrusion process and also the application of the glass filament rovings impregnated with synthetic resin.

It is however naturally also possible for the ribs to run spirally around the axis of the tube and for the glass filament rovings impregnated with synthetic resin to run similarly, whereby the strength of the tube is further increased.

Figure 2:
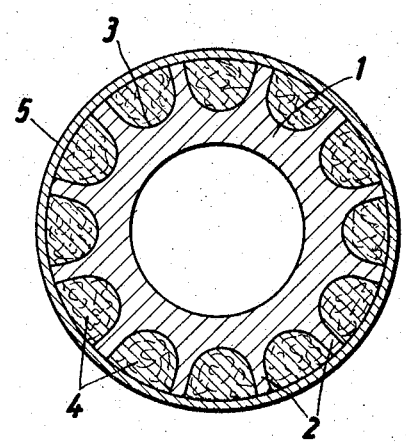
Figure 4:
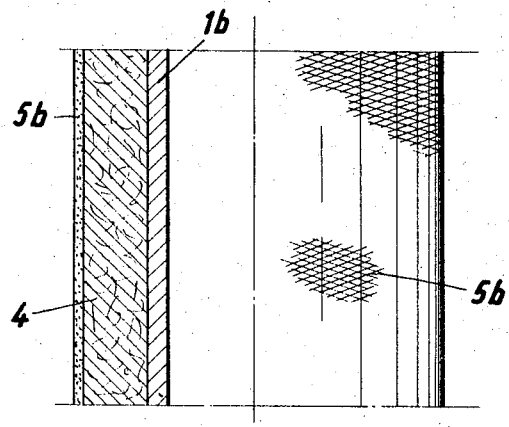
Figure 3:
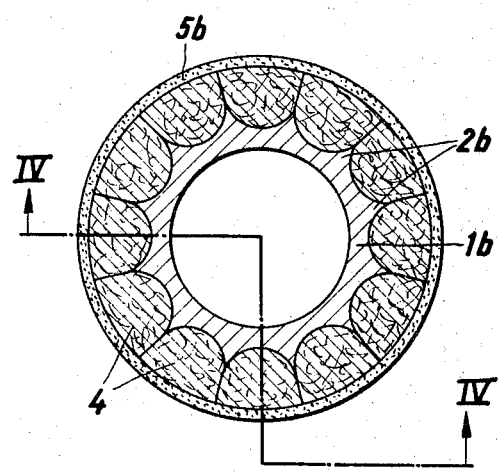
Figure 6:
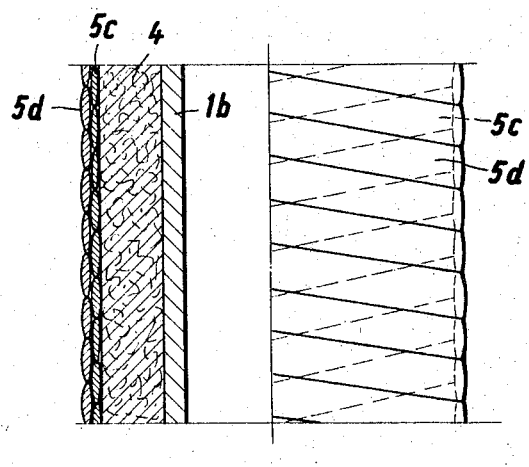
Figure 5:
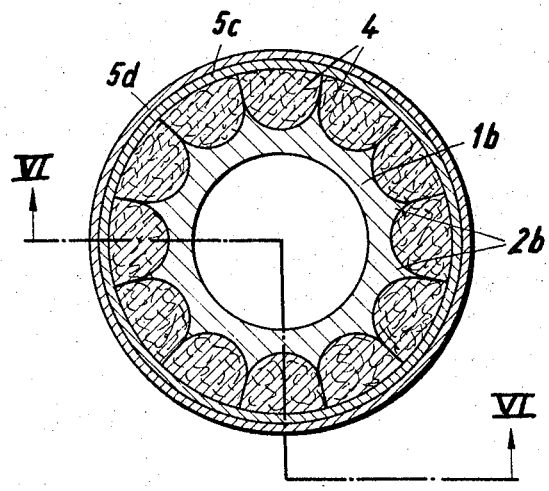

These and numerous other details of the invention will be clear from the following description of a number of examples of its performance, which are illustrated in the accompanying drawing in which:

FIGURE 1 is a sectional view through the core of the plastic tube according to a first exemplary embodiment of the invention, FIGURE 2 is a sectional view through the complete plastic tube with the core shown in FIGURE 1, FIGURE 3 is a sectional view through a plastic tube having a textile covering as outer bandage, FIGURE 4 is a view taken along the line IV—IV in FIGURE 3, the view looking in the direction of the arrows, FIGURE 5 is a sectional view through a plastic tube having a crosswise wound bandage of glass filament rovings, and FIGURE 6 is a view taken along the line VI—VI in FIGURE 5, the view looking in the direction of the arrows.

The tubular core 1 illustrated in FIGURE 1 for the plastic tube according to the invention consists of thermoplastic material, for example polyvinyl chloride, and on its outer side is provided a number of ribs 2, which enclose cavities or grooves 3 therebetween.

Glass filament rovings 4 impregnated with synthetic resin are introduced into these cavities 3 on the outer side of the core 1 (see FIGURE 2), and in the exemplary embodiment illustrated run, like the ribs 2 of the core 1, parallel to the axial direction of the tube.

The core 1 and the glass filament rovings 4 have wrapped thereabout an outer bandage 5, which consists of a single-layer winding of glass filament rovings impregnated with synthetic resin. This bandage is supported on the outer side of the ribs 2, so that an exact cylindrical outer surface of the tube is ensured.

The tubes are produced mechanically in a continuous process similar to the production of cables. The setting of the glass filament rovings 4 impregnated with synthetic resin and also of the bandage 5 takes place a certain time after the winding has been effected.

In the embodiment illustrated in FIGURES 3 and 4, a tubular plastic core 1b is provided which, similarly to the embodiment illustrated in FIGURES 1 and 2, is provided on its outer side with ribs 2b between which the glass filament rovings 4 impregnated with synthetic resin are disposed.

The bandage 5b applied to the outer side of the glass filament rovings 4 is constituted by a covering consisting essentially of textile fibers.

Finally, FIGURES 5 and 6 show a plastic tube in which the outer bandage consists of two layers 5c, 5d, wound crosswise in opposite directions, of glass filament rovings impregnated with synthetic resin. Instead of a two-layer bandage, one consisting of a larger number of layers may naturally also be provided, in which case successive layers are preferably wound crosswise in opposite directions.

The construction of the tubular core and the arrangement of the glass filament rovings running in the lengthwise direction of the tube correspond to the construction illustrated in FIGURES 3 and 4.

The invention is not to be confined to any strict conformity to the showings in the drawings but changes and modifications may be made therein so long as such changes and modifications mark no material departure from the spirit and scope of the appended claims.

What is claimed is:
1. A plastic tube comprising a tubular core of thermoplastic or thermosetting plastic having inner and outer surfaces, said outer surface being provided with alternate axially extending ribs and grooves, glass filament rovings extending axially of and filling said grooves, and an outer bandage for the core.
2. The plastic tube as claimed in claim 1 in which said ribs and glass filament rovings are so dimensioned that said outer bandage rests on the ribs.

References Cited by the Examiner

UNITED STATES PATENTS

| | | | |
|---|---|---|---|
| 666,241 | 1/1901 | Barraclough | 138—141 X |
| 1,831,724 | 11/1931 | Stokes | 138—130 |
| 2,393,496 | 1/1946 | Stedman | 138—126 |
| 2,937,662 | 5/1960 | Green | 138—149 X |
| 2,969,812 | 1/1961 | De Ganahl | 138—144 X |
| 3,002,534 | 10/1961 | Noland | 138—144 X |
| 3,230,979 | 1/1966 | Tenreiro | 138—130 |

FOREIGN PATENTS 820,945   9/1959   Great Britain.

LAVERNE D. GEIGER, *Primary Examiner.*

C. L. HOUCK, *Assistant Examiner.*